United States Patent [19]
Gherghel et al.

[11] Patent Number: 6,087,445
[45] Date of Patent: Jul. 11, 2000

[54] POLYMERS CONTAINING NYLON AND HALOGENATED POLYMER

[76] Inventors: Radu Olimpiu Gherghel, 41 Crestview Dr., Pottsville, Pa. 17901; Radu Dean Gherghel, 950 Jacks La., Orwigsburg, Pa. 17961; Jason Clifford Gherghel, 41 Crestview Dr., Pottsville, Pa. 17901

[21] Appl. No.: 09/076,718

[22] Filed: May 13, 1998

[51] Int. Cl.[7] .................................................. C08F 8/30
[52] U.S. Cl. ........................................................ 525/178
[58] Field of Search .............................................. 525/178

[56] References Cited

U.S. PATENT DOCUMENTS

| | | | |
|---|---|---|---|
| 3,741,192 | 6/1973 | Avery | 125/21 |
| 3,908,038 | 9/1975 | Nienart et al. | 427/27 |
| 4,080,357 | 3/1978 | Gergen et al. | 260/42.18 |
| 4,884,679 | 12/1989 | Graef et al. | 198/718 |
| 4,952,630 | 8/1990 | Morgan et al. | 525/72 |
| 5,225,186 | 7/1993 | Castrogiovanni et al. | 424/64 |
| 5,342,894 | 8/1994 | Robeson et al. | 525/183 |
| 5,346,320 | 9/1994 | Nguyen | 400/354 |
| 5,350,339 | 9/1994 | Carmichael | 474/79 |
| 5,658,577 | 8/1997 | Fowler et al. | 424/401 |
| 5,686,521 | 11/1997 | Massengale et al. | 524/496 |

*Primary Examiner*—Edward J. Cain
*Attorney, Agent, or Firm*—Kenyon & Kenyon

[57] ABSTRACT

Polymer compositions comprising nylon and a halogenated polymer. In one aspect, the present invention includes a polymer composition comprising about 1% to about 99% by weight of nylon and about 1% to about 99% by weight of halogenated polymer, wherein the combined percent of the nylon and the halogenated polymer is at least about 80 percent. In another aspect, the present invention includes a polymer composition consisting essentially of nylon and halogenated polymer. In yet another aspect, the present invention includes an article comprising a polymer made by a process comprising the steps of providing nylon and halogenated polymer materials; melting the nylon and halogenated polymer materials; and forming the article from the melt of nylon and halogenated polymer materials.

44 Claims, No Drawings

POLYMERS CONTAINING NYLON AND HALOGENATED POLYMER

FIELD OF THE INVENTION

The present invention relates to polymers of optimized mechanical and low friction properties, and more particularly, to polymers comprising nylon and halogenated polymers.

BACKGROUND OF THE INVENTION

Polyamides such as nylon are generally high strength, hard polymers due at least in part to the presence of a strong hydrogen bond with nitrogen and a strong covalent bond between carbon and oxygen. These polymers are used in a wide variety of applications such as gears, machine parts, rope, fibers, films, sheets and other applications where high strength is desired. Common examples of polyamides include the nylons, which are a family of polyamide polymers characterized by the presence of the amide group (—CONH). The structure of an example of a polyamide, nylon 66, is shown below:

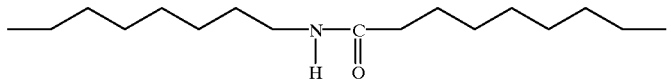

In contrast to the polyamides, halogenated polymers, which include a halogen element (i.e., fluorine, chlorine, bromine, iodine or astatine), are generally relatively low strength materials. Common examples of halogenated polymers include the fluorocarbons, which include any of a number of organic compounds analogous to hydrocarbons in which the hydrogen atoms have been replaced by fluorine. Halogenated polymers are generally exploited for their low friction properties in applications such as chemical wear, seals, bearings, release films and gaskets. For example, in polytetrafluoroethylene (TEFLON), the C—F bond is so strong that there is little bonding to external substances, which accounts for the low coefficient of friction. The structure of TEFLON is shown below:

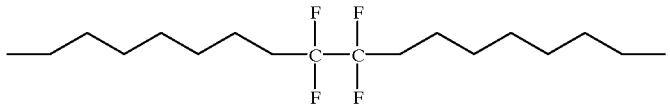

Many engineering applications would benefit from a material combining the high strength of polyamides and the low friction properties of halogenated polymers. For example, gears, bushings and release films made of TEFLON have the requisite low friction properties but have limited useful lifetimes due to their relatively low strengths. Moreover, in contrast to polyamides, halogenated polymers have very low melt strengths and thus are not suitable for many formation processes such as blown film extrusion. A combination of polyamide and halogenated polymers therefore poses the potential for significant benefits in terms of optimizing mechanical properties and allowing for a wide variety of processing procedures.

SUMMARY OF THE INVENTION

In one aspect, the present invention includes a polymer composition comprising about 1% to about 99% by weight of nylon and about 1% to about 99% by weight of halogenated polymer, wherein the combined percent of the nylon and the halogenated polymer is at least about 80 percent.

In another aspect, the present invention includes a polymer composition consisting essentially of nylon and halogenated polymer.

In yet another aspect, the present invention includes an article comprising a polymer made by a process comprising the steps of providing nylon and halogenated polymer materials; melting the nylon and halogenated polymer materials; and forming the article from the melt of nylon and halogenated polymer materials.

DETAILED DESCRIPTION

The present invention provides polymer compositions and polymer articles having optimized mechanical and friction properties. All embodiments of the present invention comprise nylon and at least one halogenated polymer to yield polymer compositions having a combination of desired properties such as strength, toughness, and low friction coefficients. In addition, the polymer compositions of the present invention provide significant cost savings over halogenated polymers (e.g., TEFLON) alone, which are typically much more expensive than nylon. Moreover, the polymer compositions of the present invention are amenable to a wide variety of processes such as, for example, injection molding, extrusion (e.g., blown film extrusion, cast film extrusion, sheet extrusion, etc.), blow molding, calendering, sheet forming, stamping, casting, and spinning. In contrast, polymers consisting only of halogenated polymers such as TEFLON may not be suited to some of these forming processes.

The inventors have surprisingly found that polyamides and halogenated polymers can be combined to produce a product having a uniform composition and optimum properties.

In one aspect, the present invention includes a polymer composition comprising about 1% to about 99% by weight of nylon and about 1% to about 99% by weight of halogenated polymer, wherein the combined percent of nylon and halogenated polymer is at least about 80% of the polymer composition. In another embodiment, the combined percent of the nylon and halogenated polymer is at least about 85% of the polymer composition. In another embodiment, the combined percent of the nylon and halogenated polymer is at least about 90% of the polymer composition. In another embodiment, the combined percent of the nylon and halogenated polymer is at least about 95% of the polymer composition. In yet another embodiment, the combined percent of the nylon and halogenated polymer is at least about 98% of the polymer composition. Other embodiments are defined by the ratio of nylon and halogenated polymer in the polymer composition. For example, in one embodiment, the polymer composition comprises about 20% of halogenated polymer. In another embodiment, the polymer composition comprises about 10% of halogenated polymer. In another embodiment, the polymer composition comprises about 5% of halogenated polymer. In another embodiment, the polymer composition comprises about 2% of halogenated polymer. In yet another embodiment, the polymer composition comprises about 1% of halogenated polymer.

In another aspect, the present invention includes polymer compositions consisting essentially of nylon and halogenated polymer. In this embodiment, the additives used in the present invention are limited to those materials that do not significantly affect the mechanical properties of the overall polymer composition. Furthermore, the polymer compositions of the present invention include low levels of impurities that do not significantly affect overall mechanical properties.

The nylon used in all embodiments of the present invention comprises any suitable nylon such as, for example, nylon 6, nylon 66, nylon 610, nylon 612, nylon 46, nylon 11, nylon 12, nylon 669, and mixtures and copolymers thereof. The nylon preferably comprises nylon 6 (e.g., available from BASF Corporation (Wyandotte, Minn.) as ULTRAMID® KR4418) and/or nylon 66 (e.g., available from Dupont (Parkersburg, W.Va.) as ZYTEL® 42A NC010). Nylon 6 is a polymer of caprolactam, and nylon 66 is a condensation product of adipic acid and hexamethylenediamine. When the polymer composition of the present invention includes both nylon 6 and nylon 66, it is preferred, but not required, that these materials be provided in approximately equal proportions.

The halogenated polymer used in the present invention is any suitable halogenated polymer that is combinable with nylon and imparts desired anti-friction properties thereto. Such halogenated polymers are preferably selected from polytetrafluoroethylene, polychlorotrifluoroethylene, perfluoroalkoxy, polyethylene-chlorotrifluoroethylene, polyethylene-tetrafluoroethylene, tetrafluoroethylene-hexafluoropropylene, fluorinated ethylene propylene, polyvinylidene fluoride, tetrafluoroethylene-perfluoro propylvinylether, and copolymers and mixtures thereof. Examples of preferred halogenated polymers are HALAR® 500 (AUSTIMONT USA, Inc., Morristown, N.J.) (a copolymer of ethylene and chlorotrifluoroethylene) and TEFZEL® (Dupont, Wilmington, Del.) (a copolymer of tetrafluoroethylene and ethylene).

The polymer compositions of the present invention optionally include additives such as dyes and colorants, antioxidants (such as, for example, phenols in general, alkylated phenols, bisphenols, butylated hydroxy toluene, esters, and organic phosphites and phosphates), antistatic agents (such as, for example, amines, glycerol esters, quaternary ammonium compounds, and anionics), flame retardants, stabilizers (such as, for example, cuprous iodide, epoxies, and metals such as barium, cadmium and zinc), lubricants (such as, for example, waxes and metallic stearates), and plasticizers (such as, for example, adipic acid derivates, caprolactam and benzoic acid derivates).

The present invention includes articles that are made by a polymer comprising nylon and a halogenated polymer. More specifically, the present invention includes articles made by a process comprising the steps of providing nylon and halogenated polymer materials, melt mixing the nylon and halogenated polymer materials, and forming the article from the resulting melt mixture. The step of melt mixing preferably includes the step of heating the nylon and halogenated polymer material to a temperature within the range of 450° F. and 600° F. The step of forming the article from the resulting melt mixture preferably includes the step of extruding the melt mixture. Examples of articles formed by the polymer composition of the present invention include gears, bearings, fibers, yarn, rope, seals, chemical wear, containers, gaskets, tubing, hose, diaphragms, linings, fittings, wire jacketing, sockets, connectors, switch components, packaging and release films; as may be used in industries such as, for example, the aerospace, electronic, automotive, apparel, medical, pharmaceutical, chemical and watercraft industries.

The present invention is further described with reference to the following non-limiting examples.

EXAMPLE 1

Polymer films were produced according to an embodiment of the present invention. Nylon 6, nylon 66, and ethylene-chlorotrifluoroethylene copolymer were obtained in pellet form. These materials were weighed to the following composition: 47.5% nylon 6, 47.5% nylon 66, and 5% ethylene-chlorotrifluoroethylene copolymer to a total of 200 lbs. The materials were put into an industrial mixer for about 15 minutes to obtain a homogeneous mix. The mix was then fed into a screw extruder (Vitor, Xaloy Inc.) operating at a temperature of approximately 485° F.–490° F. As is known in the art, the extruder was fitted with a rotator, die, air ring and nips for the production of blown film. The rotator and die were operated at a temperature of about 495° F. The blow extruded product was a film having a thickness of about 2 mils and a width of about 30 inches. This process was repeated for a composition having 45.0% nylon 6, 45.0% nylon 66, and 10% ethylene-chlorotrifluoroethylene copolymer to yield a film having a thickness of about 2 mils and a width of about 30 inches.

EXAMPLE 2

A polymer film was produced according to an embodiment of the present invention. Nylon 6, nylon 66, and ethylene-tetrafluoroethylene copolymer were obtained in pellet form. These materials were weighed to the following percentages: 45 nylon 6, 45% nylon 66, and 10% ethylene-tetrafluoroethylene copolymer to a total of 200 lbs. The materials were put into an industrial mixer for about 15 minutes to obtain a homogeneous mix. The mix was then fed into a screw extruder (Vitor, Xaloy Inc.) operating at a temperature of approximately 490° F.–500° F. As is known in the art, the extruder was fitted with a rotator, die, air ring and nips for the production of blown film. The rotator and die were operated at a temperature of about 505° F.–510° F. The blow extruded product was a film having a thickness of about 2 mils and a width of about 30 inches. This process was repeated for a composition having 47.5% nylon 6, 47.5% nylon 66, and 5% ethylene-tetrafluoroethylene copolymer to yield a film having a thickness of about 2 mils and a width of about 30 inches.

EXAMPLES 3

Polymer films were produced to compare the mechanical properties of the polymer compositions of the present invention with pure nylon and pure halogenated polymer materials. Table I lists the compositions tested along with corresponding mechanical property data. Samples T1 and T2 (pure nylon materials) were made by a blow extrusion process to yield polymer films having thicknesses of about 2 mils. Samples T3 to T5 (pure halogenated polymer materials) were made by a cast film process to yield polymer films having a thickness of about 1 mil. Samples T6 and T7 (polymer compositions of the present invention) were made by a blow extrusion process analogous to that described in Example 2, to yield polymer films having a thickness of about 2 mils. Samples T8 and T9 (polymer compositions of the present invention) were made by a blow film extrusion process analogous to that described in Example 1, to yield polymer films having a thickness of about 2 mils. In the Table, "ETFE" refers to ethylene-tetrafluoroethylene copolymer, "FEP" refers to fluorinated ethylene propylene, "PTFE" refers to polytetrafluoroethylene, and "ECTFE" refers to ethylene-chlorotrifluoroethylene copolymer.

The mechanical properties of samples T1 to T8 were measured using a LLOYD 500 tensile testing machine with a computer interface for collecting data and measuring the mechanical properties. All tests were performed in accordance with ASTM standard D-882-83, and at least three tests were performed per composition. Tests were conducted at room temperature (about 70° F.), and the strain rate for all samples was about 20 in/min. Two rows per composition are shown in the table—the first (upper row) corresponds to measurements taken in the direction of polymer orientation imparted by the blow extrusion process, and the second (lower row) corresponds to measurements taken in the direction perpendicular to the direction of polymer orientation. In the table, "E" refers to the modulus of elasticity, "$\sigma_y$" refers to the 0.2% offset yield strength, "$\sigma_{max}$" refers to the maximum stress achieved by the sample (i.e., the tensile strength), "$\sigma_b$" refers to the stress at fracture, and "%el" refers to the percent elongation of the sample at fracture.

TABLE I

Mechanical properties of nylon, fluoropolymers, and nylon-fluoropolymer mixtures.

| Sample | Composition | E (psi × $10^3$) | $\sigma_y$ (psi × $10^3$) | $\sigma_{max}$ (psi × $10^3$) | $\sigma_b$ (psi × $10^3$) | % el |
|---|---|---|---|---|---|---|
| T1 | nylon 6 | 27.0 | 5.6 | 8.1 | 7.8 | 300 |
|    |         | 43.7 | 5.6 | 8.5 | 8.1 | 366 |
| T2 | 82% nylon 6 | 15.4 | 3.6 | 5.3 | 4.8 | 254 |
|    | 18% nylon 669 | 37.0 | 4.4 | 8.2 | 8.0 | 389 |
| T3 | ETFE | 5.5 | 2.8 | 2.9 | 3.0 | 216 |
|    |      | 9.7 | 4.6 | 4.6 | 2.8 | 152 |
| T4 | FEP | 0.35 | 0.94 | 2.7 | 1.8 | 178 |
|    |     | 0.42 | —    | 2.6 | 1.0 | 93  |
| T5 | PTFE | 0.16 | — | 4.3 | 4.3 | 465 |
|    |      | 0.16 | — | 2.5 | 1.0 | 121 |
| T6 | 5% ETFE | 22.0 | 9.1 | 14.1 | 13.8 | 407 |
|    | 47.5% nylon 6 | 42.6 | 7.2 | 9.7 | 9.5 | 398 |
|    | 47.5% nylon 66 | | | | | |
| T7 | 10% ETFE | 38.5 | 7.2 | 10.2 | 9.8 | 303 |
|    | 45% nylon 6 | 34.8 | 6.5 | 8.2 | 7.4 | 277 |
|    | 45% nylon 66 | | | | | |
| T8 | 5% ECTFE | 32.6 | 6.8 | 10.3 | 10.1 | 404 |
|    | 47.5% nylon 6 | 27.0 | 6.5 | 7.9 | 7.9 | 359 |
|    | 47.5% nylon 66 | | | | | |
| T9 | 10% ECTFE | 36.6 | 8.3 | 10.1 | 9.8 | 335 |
|    | 45% nylon 6 | 44.3 | 6.6 | 9.9 | 9.9 | 414 |
|    | 45% nylon 66 | | | | | |

The data in Table I illustrates that the polymer compositions of the present invention (i.e., samples T6 to T9) generally have superior mechanical properties (i.e., higher moduli of elasticity, yield strengths, tensile strengths, stress to fracture, and percent elongations) in comparison to both the pure nylon and pure halogenated polymer compositions tested. The polymer compositions of the present invention are thus significantly tougher and can withstand higher stress conditions than the polymer compositions of samples T1 to T5. This result is especially surprising with respect to the pure nylons, which are generally known as high-strength polymeric materials. The data in Table I thus illustrates that the inventors have discovered that halogenated polymers such as ETFE and ECTFE can be added to nylons without causing deleterious effects on mechanical properties.

EXAMPLE 4

Polymer films were produced to compare the friction properties of the polymer compositions of the present invention with pure halogenated polymer materials. Table II lists the compositions tested along with corresponding coefficient of friction data. Sample F1 (pure nylon 6) was made by a blow film extrusion process to yield a polymer film having a thickness of about 2 mils. Samples F2 and F3 (pure halogenated polymer materials) were made by a cast film process to yield polymer films having a thickness of about 1 mil. Samples F4 and F5 (polymer compositions of the present invention) were made by a blow extrusion process analogous to that described in Example 2, to yield polymer films having a thickness of about 2 mils. Samples F6 and F7 (polymer compositions of the present invention) were made by a blow extrusion process analogous to that described in Example 1, to yield polymer films having a thickness of about 2 mils. All samples had a gauge length of about one inch.

The coefficients of friction for samples F1 to F7 were measured using a LLOYD 500 tensile testing machine with a computer interface for collecting data and measuring the mechanical properties. All tests were performed in accordance with ASTM standard D-1894, and at least one test was performed per sample. Tests were conducted at a speed of about 5 in/min. In Table II, "$\mu_s$" and "$\mu_k$" refer to static and kinetic coefficients of friction, respectively.

TABLE II

Coefficient of friction data of nylon, fluoropolymers, and nylon-fluoropolymer mixtures.

| Sample | Composition | $\mu_s$ | $\mu_k$ |
|---|---|---|---|
| F1 | nylon 6 | 4.6 | 3.1 |
| F2 | FEP | 3.6 | 2.9 |
| F3 | PTFE | 3.8 | 2.5 |
| F4 | 5% ETFE | 5.3 | 3.0 |
|    | 47.5% nylon 6 | | |
|    | 47.5% nylon 66 | | |
| F5 | 10% ETFE | 2.7 | 1.7 |
|    | 45% nylon 6 | | |
|    | 45% nylon 66 | | |
| F6 | 5% ECTFE | 2.7 | 1.6 |
|    | 47.5% nylon 6 | | |
|    | 47.5% nylon 66 | | |
| F7 | 10% ETFE | 2.1 | 1.2 |
|    | 45% nylon 6 | | |
|    | 45% nylon 66 | | |

The data in Table II illustrates that the polymer compositions of the present invention (i.e., samples F6 to F9) generally have lower coefficients of friction than the pure nylon and pure halogenated polymer compositions tested. It should be noted that although the data in Table II shows the polymer compositions of the present invention to generally have anti-friction properties that are superior to those of fluorinated ethylene propylene and polytetrafluoroethylene, it should be recognized that samples F2 and F3 were made by a different process than samples F1 and F4 to F7, and thus can be expected to have different surface properties. The differences in the coefficient of friction properties may thus be at least partially explained by surface effects in addition to compositional effects. However, a direct comparison between pure nylon (sample F1) and the polymer compositions of the present invention (samples F4 to F7), all of which were formed by the same blow extrusion process and can thus be expected to have substantially identical surface characteristics, indicates that the addition of halogenated polymers to nylon effectively lowers the coefficient of friction of pure nylon.

A review of Examples 3 and 4 indicates that the polymer compositions of the present invention provide an optimal balance between mechanical and anti-friction properties not previously known in the art. The halogenated polymer portion of the compositions of the present invention impart desired anti-friction properties, while the nylon portion gives the compositions desired strength and toughness. Through the process of the present invention, the halogenated polymer and nylon portions of the compositions of the present invention are combined without resulting in deleterious effects to the overall composition. The inventors have thus shown that some of the polymer compositions of the present invention have superior mechanical properties when compared to certain nylons, and superior anti-friction properties when compared to certain halogenated polymers.

A further aspect of the present invention is illustrated by a review of Examples 1 and 2, which show that the polymer compositions of the present invention are amenable to the blow extrusion process for the formation of thin films. This is in contrast to pure halogenated polymer materials such as TEFLON, thin films of which cannot be made by forming processes such as blow extrusion because of the low melt strengths of such pure halogenated polymer materials.

The present invention provides for polymer compositions of nylon and halogenated polymer. Although the present invention has been described with respect to several exemplary embodiments, there are many other variations of the above-described embodiments which will be apparent to those skilled in the art, even where elements have not explicitly been designated as exemplary. It is understood that these modifications are within the teaching of the present invention, which is to be limited only by the claims appended hereto.

What is claimed is:

1. A polymer composition comprising:
   about 1% to about 99% by weight of nylon; and
   about 1% to about 99% by weight of halogenated polymer; wherein
   the combined percent of said nylon and said halogenated polymer is at least about 80 percent; and wherein
   the nylon and the halogen polymer are melt-mixed together.

2. The polymer composition of claim 1, wherein the combined percent of said nylon and said halogenated polymer is at least about 85 percent.

3. The polymer composition of claim 1, wherein the combined percent of said nylon and said halogenated polymer is at least about 90 percent.

4. The polymer composition of claim 1, wherein the combined percent of said nylon and said halogenated polymer is at least about 95 percent.

5. The polymer composition of claim 1, wherein the combined percent of said nylon and said halogenated polymer is at least about 98 percent.

6. The polymer composition of claim 1 comprising about 20% by weight of said halogenated polymer.

7. The polymer composition of claim 1 comprising about 10% by weight of said halogenated polymer.

8. The polymer composition of claim 1 comprising about 5% by weight of said halogenated polymer.

9. The polymer composition of claim 1 comprising about 2% by weight of said halogenated polymer.

10. The polymer composition of claim 1 comprising about 1% by weight of said halogenated polymer.

11. The polymer composition of claim 1 comprising:
    about 80% to about 99% by weight of said nylon; and
    about 1% to about 20% by weight of said halogen polymer; wherein
    the combined percent of said nylon and said halogenated polymer is at least about 95 percent.

12. The polymer composition of claim 1, wherein said nylon comprises nylon 6 and nylon 66.

13. The polymer composition of claim 12, wherein said nylon 6 and said nylon 66 are provided in approximately equal proportions.

14. The polymer composition of claim 1, wherein said halogenated polymer is selected from the group consisting of polytetrafluoroethylene, polychlorotrifluoroethylene, perfluoroalkoxy, polyethylene-chlorotrifluoroethylene, polyethylene-tetrafluoroethylene, tetrafluoroethylene-hexafluoropropylene, fluorinated ethylene propylene, polyvinylidene fluoride, tetrafluoroethylene-perfluoro propylvinylether, and copolymers and mixtures thereof.

15. The polymer composition of claim 1, wherein
    said nylon comprises nylon 6 and nylon 66; and
    said halogenated polymer comprises polytetrafluoroethylene.

16. The composition of claim 1, further comprising an additive selected from the group consisting of dyes, colorants, antioxidants, antistatic agents, flame retardants, stabilizers, lubricants, and plasticizers.

17. A composition comprising a polymer portion consisting essentially of nylon and halogenated polymer, wherein the nylon and halogen polymer are melt-mixed together.

18. The composition of claim 17, wherein said nylon comprises nylon 6 and nylon 66.

19. The composition of claim 17, wherein said halogenated polymer is selected from the group consisting of polytetrafluoroethylene, polychlorotrifluoroethylene, perfluoroalkoxy, polyethylene-chlorotrifluoroethylene, polyethylene-tetrafluoroethylene, tetrafluoroethylene-hexafluoropropylene, fluorinated ethylene propylene, polyvinylidene fluoride, tetrafluoroethylene-perfluoro propylvinylether, and copolymers and mixtures thereof.

20. The composition of claim 18, wherein said nylon 6 and said nylon 66 are provided in approximately equal proportions.

21. The composition of claim 18, wherein said halogenated polymer comprises tetrafluoroethylene.

22. The composition of claim 18, wherein said halogenated polymer comprises a copolymer of ethylene and chlorotrifluoroethylene.

23. The composition of claim 18, wherein said halogenated polymer comprises a copolymer of tetrafluoroethylene and hexafluoropropylene.

24. The composition of claim 18, wherein said halogenated polymer comprises a copolymer of tetrafluoroethylene and perfluoro propyl vinyl ether.

25. The composition of claim 18, wherein said halogenated polymer comprises a copolymer of tetrafluoroethylene and ethylene.

26. The composition of claim 18, wherein
   said nylon 6 and said nylon 66 are provided in approximately equal proportions; and
   said halogenated polymer comprises polytetrafluoroethylene.

27. The composition of claim 17, further comprising an additive selected from the group consisting of dyes, colorants, antioxidants, antistatic agents, flame retardants, stabilizers, lubricants, and plasticizers.

28. An article comprising a polymer made by a process comprising the steps of:
   providing a mixture of nylon and halogenated polymer materials;
   melting said mixture of nylon and halogenated polymer materials; and
   forming said article from the melt of said nylon and halogenated polymer materials.

29. The article of claim 28, wherein said nylon comprises nylon 6 and nylon 66.

30. The article of claim 28, wherein said step of melting comprises the step of heating said nylon and halogenated polymer materials to a temperature within the range of 450° F. to 600° F.

31. The article of claim 28, wherein said step of forming includes the step of extruding said melt of said nylon and halogenated polymer materials.

32. The article of claim 31, wherein said step of extruding comprises blow film extrusion.

33. The article of claim 31, wherein said step of extruding comprises cast film extrusion.

34. The article of claim 28, wherein said step of forming includes the step of injection molding said melt of said nylon and halogenated polymer materials.

35. A polymer composition comprising:
   about 1% to about 99% by weight of nylon; and
   about 1% to about 20% by weight of halogenated polymer; wherein
   the combined percent of said nylon and said halogenated polymer is at least about 80 percent.

36. The polymer composition of claim 35 comprising about 20% by weight of said halogenated polymer.

37. The polymer composition of claim 35 comprising about 10% by weight of said halogenated polymer.

38. The polymer composition of claim 35 comprising about 5% by weight of said halogenated polymer.

39. The polymer composition of claim 35 comprising about 2% by weight of said halogenated polymer.

40. The polymer composition of claim 35 comprising about 1% by weight of said halogenated polymer.

41. A composition comprising a polymer portion consisting essentially of halogenated polymer and nylon, wherein said nylon comprises nylon 6 and nylon 66, and wherein said halogenated polymer comprises a copolymer selected from the group consisting of
   ethylene and chlorotrifluoroethylene,
   tetrafluoroethylene and hexafluoropropylene,
   tetrafluoroethylene and perfluoro propyl vinyl ether, and
   tetrafluoroethylene and ethylene.

42. The polymer composition of claim 1, wherein said nylon comprises at least one nylon selected from the group consisting of nylon 6, nylon 66, nylon 610, nylon 612, nylon 46, nylon 11, nylon 12, and nylon 669.

43. The composition of claim 17, wherein said nylon comprises at least one nylon selected from the group consisting of nylon 6, nylon 66, nylon 610, nylon 612, nylon 46, nylon 11, nylon 12, and nylon 669.

44. The article of claim 28, wherein said nylon comprises at least one nylon selected from the group consisting of nylon 6, nylon 66, nylon 610, nylon 612, nylon 46, nylon 11, nylon 12, and nylon 669.

* * * * *

UNITED STATES PATENT AND TRADEMARK OFFICE
CERTIFICATE OF CORRECTION

PATENT NO. : 6,087,445
DATED : July 11, 2000
INVENTOR(S) : Gherghel et al.

Page 1 of 1

It is certified that error appears in the above-identified patent and that said Letters Patent is hereby corrected as shown below:

Column 7,
Line 52, change "halogen polymer" to read -- halogenated polymer --.

Column 8,
Line 40, change "halogen polymer" to read -- halogenated polymer --.

Signed and Sealed this

Thirtieth Day of October, 2001

Attest:

NICHOLAS P. GODICI
Attesting Officer       Acting Director of the United States Patent and Trademark Office